May 22, 1928.

J. B. PUTNAM 1,670,550

COMBINED INTAKE AND EXHAUST MANIFOLD

Filed Nov. 11, 1924

James B. Putnam.
INVENTOR

BY Victor J. Evans.
ATTORNEY

Patented May 22, 1928.

1,670,550

UNITED STATES PATENT OFFICE.

JAMES B. PUTNAM, OF EL CAMPO, TEXAS.

COMBINED INTAKE AND EXHAUST MANIFOLD.

Application filed November 11, 1924. Serial No. 749,356.

This invention relates to internal combustion engines, and contemplates forming the intake and exhaust manifolds in a unitary structure, and wherein the intake manifold is surrounded by the exhaust manifold so that the fuel is preheated prior to its admittance to the engine cylinders, the exhaust manifold having two separate and distinct outlets either of which may be closed to cause the exhaust to pursue a particular course with relation to the intake manifold, and in this manner subject the fuel to different heat temperatures as the occasion may require.

The nature and advantages of the invention will be better understood when the following detailed described is read in connection with the accompanying drawings, the invention residing in the construction, combination and arrangement of parts as claimed.

In the drawings forming part of this application like numerals of reference indicate similar parts in the several views, and wherein.

Figure 4:
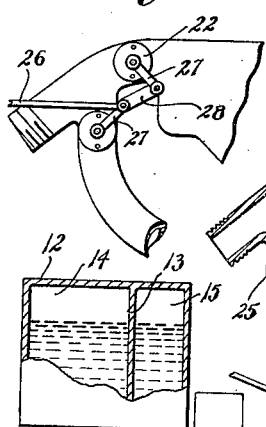
Figure 4 is a fragmentary view showing how the valves for the outlets of the exhaust manifold are controlled.

Referring to the drawing in detail 10 indicates generally an internal combustion engine of any well known construction, the carburetor for which is indicated generally at 11. The carburetor may be of any suitable construction, and is supplied with fuel from a tank 12. This tank is divided by a partition 13 into separate compartments 14 and 15 respectively, the former being adapted to contain a high test fuel such as gasoline, while the latter is adapted to contain a low grade fuel such as kerosene or the like. Pipes 16 lead from these compartments to the carburetor.

Figure 1:
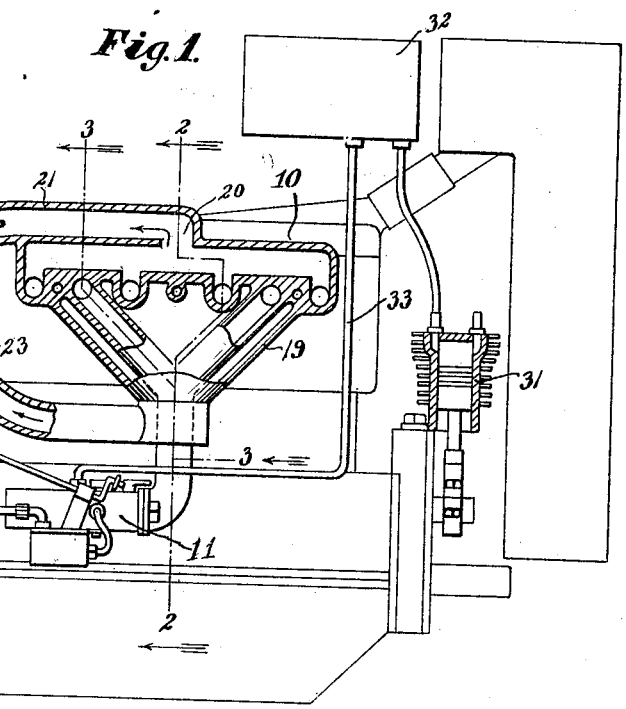
Figure 1 is a view in elevation of a motor showing the manifold structure partly in section.
Figure 2:
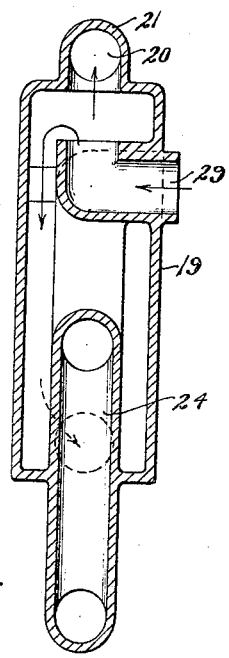
Figure 2 is a sectional view taken on line 2—2 of Figure 1.
Figure 3:
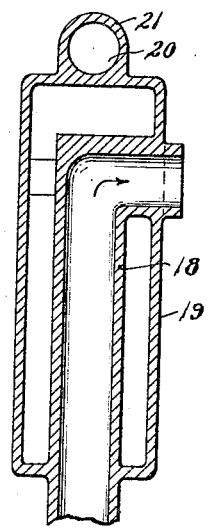
Figure 3 is a sectional view taken on line 3—3 of Figure 1.

The manifold structure forming the gist of the present invention is preferably of the outline shown in Figures 1 to 3 inclusive, the intake manifold and the exhaust manifold being formed in one piece, the intake manifold 18 being arranged within the exhaust manifold 19, so that the fuel passing through the inlet manifold is subjected to the heat from the exhaust gases, with a view of preheating and vaporizing the fuel prior to its admittance into the cylinders of the motor.

It will be noted upon inspection of Figure 1 that the exhaust manifold is provided with an outlet opening 20 arranged centrally thereof, to allow the exhaust gases to enter the exhaust pipe 21 at this point, this pipe being provided with a valve 22 for a purpose to be hereinafter described. Depending from the exhaust pipe 21 adjacent the outer end thereof is a branch pipe 23 which is curved in the direction of the carburetor, partly surrounding the latter and communicating with the exhaust manifold through an opening 24 arranged directly beneath and in axial alignment with the opening 20 above the intake manifold as shown. Also arranged in this branch pipe 23 is a valve 25, and by alternately opening and closing the valves 22 and 25 respectively, the course which must be pursued by the exhaust gases in finding their way to the atmosphere can be easily regulated or controlled by the operator through the instrumentality of an operating rod 26. As shown in Figure 4 the valves 22 and 25 are provided with handles 27 which are arranged angularly with respect to each other, because of the fact that one valve is always closed when the other is opened, but which handles are connected together by a link 28 so that these valves are simultaneously actuated through the rod 26.

In practice, fuel to operate the motor is taken from either of the compartments 14 and 15 of the fuel supply tank 12. Now, when the motor is in operation, the exhaust gases passing through the exhaust manifold 19 is utilized to heat the fuel flowing to the motor through the intake manifold. The degree of heat to which the fuel is subjected should vary under different conditions, and in accordance with the present invention, the exhaust gases may be maintained within the exhaust manifold an appreciable length of time to properly heat the fuel when necessary, or it may be quickly exhausted from said manifold when desired. For instance in warm weather it may not be desired to use the exhaust gases for the purposes of heating the fuel in the manner above stated, and under said circumstances the valve 22 would be opened and the valve 25 closed. Consequently when the exhaust gases enter the exhaust manifold in the usual manner as at 29, the said exhaust gases would pass directly through the central opening 20 into the exhaust pipe 21 and conveyed to the atmosphere without being unnecessarily confined within the exhaust manifold. On the other hand when the motor is being used in cold weather, it is quite desirable to preheat the fuel before admitting it to the cylinders of the motor in which event the valve 22 would be closed and the valve 25 opened. Consequently the exhaust gases entering the exhaust manifold at 29 would not so readily escape through the exhaust pipe 21 and opening 20, but would be forced to travel around the intake manifold for an appreciable length of time before it would pass through the opening 24 into the branch pipe 23 which communicates with the exhaust pipe 21 at the point shown in Figure 1.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

In combination an intake and exhaust manifold forming a unitary structure, with the intake manifold disposed within the exhaust manifold, two channels of escape leading from the exhaust manifold for the exhaust gases, one channel having a single inlet end connected into the exhaust manifold at a point approximately midway between its ends and adjacent the intake manifold whereby said gases can be quickly exhausted, the other channel having a single inlet connected into the exhaust manifold beneath the intake manifold and around the inlet pipe immediately adjacent the carburetor, whereby said gases are caused to circulate about the intake manifold for an appreciable time prior to their escape, and to preheat the fuel passing through said carbureter and intake manifold.

In testimony whereof I affix my signature.

JAMES B. PUTNAM.